Patented Jan. 16, 1934

1,944,122

UNITED STATES PATENT OFFICE 1,944,122

GAS SCRUBBING

Harvey Rome Fife, Pittsburgh, Pa., assignor to Carbide and Carbon Chemicals Corporation, a corporation of New York No Drawing. Application July 29, 1932
Serial No. 626,209

7 Claims. (Cl. 23—2)

The invention relates to scrubbing of gases with amine solutions, referring more specifically to the prevention of foaming in such solutions.

Foaming is commonly encountered in nearly all types of gas scrubbing systems. Where the scrubbing medium is water and the like, it is customary to add hydrocarbons, mineral or vegetable oils, or partially soluble alcohols to stop the foaming. These agents are moderately successful except in certain extreme cases where the foaming is excessive. When amine solutions, such as solutions of ethanol amines for example, are used as scrubbing media the foam problem is aggravated inasmuch as these solutions tend to foam seriously when in contact with acid gases. Foaming of the absorbing medium seriously interrupts normal operation of gas scrubbing equipment. The usual condition occurring in practice is an apparent clogging of the ordinary countercurrent gas scrubber which results in the formation of a high pressure drop through the scrubber, frequently accompanied by a loss of scrubbing liquid.

In attempting to overcome the foaming difficulties when using amine solution, I have tested the effect of the usual hydrocarbons, oils and other defoaming agents. I have found that vegetable and animal oils are temporarily effective, but do not afford permanent relief. The use of these oils prevents foaming for some time but after a certain time foaming again becomes serious and is not affected by further additions of this type of agents. Distillation, freezing and filtration, treatment with various solvents and similar methods of treating the absorbing medium have been tried with no useful or practical results.

I have found that activated carbon is effective in removing the foam-forming agents from aqueous amine solutions used in scrubbing acid gases. By a simple filtration of the contaminated liquid through a bed of activated carbon the tendency to foam is strongly suppressed. Various types of activated carbons have been tested and found to be effective, for example: cocoanut charcoal, activated wood charcoal, and bone charcoal, in various sizes such as 8 to 14 mesh. There are certain advantages in using activated wood charcoal, inasmuch as it permits somewhat easier filtration than other available activated carbons.

I have also found useful a combination of two methods of treating the amine solutions, namely addition of vegetable or animal oil to secure immediate and temporary relief from foaming, and use of filtration through activated carbon of a portion of the solution as a means of constant control. I find that satisfactory control of foaming may be obtained by continually filtering and recirculating from 5% to 10% of the total circulating amine solution in the scrubbing apparatus; and that sudden formation of large amounts of foam, such as occasionally occurs, may be dissipated by adding a small amount of animal or vegetable oil. Usually about 3 gallons of oil to each 10,000 gallons of amine solution will be sufficient to stop foaming temporarily. The oil together with accumulated foaming agents are removed by the filtration through the activated carbon.

After use for some time the activated carbon will lose its effectiveness to an appreciable extent. When this occurs the carbon may be revived or restored to substantially its original effectiveness by usual reactivation methods, such as treatment with superheated steam. In practical applications of my invention it will be advantageous to provide two filtering units, only one of which is in use for filtering at any one time, so that there will always be available one unit containing fresh carbon. This arrangement allows a mass of contaminated carbon to be reactivated conveniently without interrupting the circulation and filtration of the amine solution.

I claim:

1. Method of treating aqueous solutions used in gas treating operations and which contain an amine and which tend to foam which comprises bringing at least a portion of the solution into contact with activated carbon.

2. Method of treating aqueous amine solutions used in gas treating operations and which tend to foam which comprises adding an oil to said solution and bringing at least a portion of said solution into contact with activated carbon.

3. Method of treating aqueous ethanol amine solutions used in gas treating operations and which have a tendency to foam which comprises adding to the solution an agent chosen from the group consisting of animal and vegetable oils and bringing at least a portion of said solution into contact with an agent chosen from the group consisting of activated cocoanut charcoal, activated wood charcoal, and activated bone charcoal.

4. Process of scrubbing acid gases which comprises bringing the gas into contact with an aqueous solution which contains an amine and continuously bringing a portion of the solution into contact with activated carbon.

5. Process of scrubbing acid gases which comprises bringing the gas into contact with an aqueous solution which contains an ethanol amine and continuously bringing a portion of the solution into contact with activated carbon.

6. Process of scrubbing acid gases which comprises bringing the gas into contact with an aqueous amine solution, adding an oil to the solution, and continuously filtering a portion of the solution through activated carbon.

7. Process of scrubbing acid gases which comprises bringing the gas into contact with an aqueous solution of ethanol amines, adding to the solution an agent chosen from the group which consists of animal and vegetable oils, and continuously filtering at least about 5% of the solution through activated carbon.

HARVEY ROME FIFE.

CERTIFICATE OF CORRECTION.

Patent No. 1,944,122.　　　　　　　　　　　　　　　　　January 16, 1934.

It is hereby certified that the name of the patentee in the above numbered patent is erroneously written and printed as "Harvey Rome Fife" whereas said name should have been written and printed as Harvey Rowe Fife; and that the said Letters Patent should be read with this correction therein that the same may conform to the record of the case in the Patent Office.

Signed and sealed this 20th day of March, A. D. 1934.

F. M. Hopkins (Seal)　　　　　　　　　　　　　　　　　Acting Commissioner of Patents.